US012355663B2

(12) United States Patent
Mishra et al.

(10) Patent No.: US 12,355,663 B2
(45) Date of Patent: Jul. 8, 2025

(54) ENHANCED MULTICAST TRACEROUTE TO RECEIVE INLINE FAILURE REPLY

(71) Applicant: Cisco Technology, Inc., San Jose, CA (US)

(72) Inventors: Mankamana Prasad Mishra, San Jose, CA (US); Anuj Budhiraja, San Jose, CA (US); Sridhar Santhanam, Dublin, CA (US); Sunil Krishnan K, Kannur (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 385 days.

(21) Appl. No.: 17/808,652

(22) Filed: Jun. 24, 2022

(65) Prior Publication Data

US 2023/0421491 A1 Dec. 28, 2023

(51) Int. Cl.
*H04L 45/48* (2022.01)
*H04L 45/00* (2022.01)
*H04L 45/02* (2022.01)
*H04L 45/12* (2022.01)

(52) U.S. Cl.
CPC .............. *H04L 45/48* (2013.01); *H04L 45/02* (2013.01); *H04L 45/127* (2013.01); *H04L 45/20* (2013.01)

(58) Field of Classification Search
CPC ..... H04L 43/0852; H04L 43/10; H04L 45/02; H04L 45/127; H04L 45/16; H04L 45/20; H04L 45/26; H04L 45/48
See application file for complete search history.

(56) References Cited

U.S. PATENT DOCUMENTS

| | | | |
|---|---|---|---|
| 8,472,346 B1* | 6/2013 | Bahadur | H04L 45/28 370/254 |
| 2006/0285498 A1 | 12/2006 | Wakumoto et al. | |
| 2011/0317696 A1 | 12/2011 | Aldrin et al. | |
| 2012/0051231 A1 | 3/2012 | Ou | |
| 2014/0348022 A1* | 11/2014 | Jain | H04L 41/12 370/254 |
| 2018/0278514 A1 | 9/2018 | Chadha | |
| 2020/0389379 A1 | 12/2020 | Bristow | |
| 2020/0389385 A1* | 12/2020 | Nainar | H04L 43/50 |
| 2021/0320837 A1* | 10/2021 | Nandy | H04L 45/16 |

OTHER PUBLICATIONS

Asaeda A., et al., "Mtrace Version 2: Traceroute Facility for IP Multicast", Internet Engineering Task Force (IETF), Request for Comments: 8487, Internet Society (ISOC) 4, Rue Des Falaises CH—1205 Geneva, Switzerland, Oct. 29, 2018, pp. 1-41, XP015128220, paragraphs [0003]-[0004].

(Continued)

*Primary Examiner* — Donald L Mills
(74) *Attorney, Agent, or Firm* — Baker Botts L.L.P.

(57) ABSTRACT

In one embodiment, a method by a router in a multicast network includes receiving a multicast trace query comprising a data packet, editing the multicast trace query to include data corresponding to the data packet, transmitting the edited multicast trace query to a subsequent router, transmitting a first message indicating the edited multicast trace query was transmitted to the subsequent router, and starting a timer for a determined period of time.

17 Claims, 4 Drawing Sheets

(56) References Cited

OTHER PUBLICATIONS

International Search Report and Written Opinion for International Application No. PCT/US2023/025177, mailed Sep. 19, 2023, 13 Pages.
Sarac K., et al., "Tracetree: A Scalable Mechanism to Discover Multicast Tree Topologies in the Internet", IEEE/ACM Transactions on Networking, New York, NY, US, vol. 12, No. 5, Oct. 5, 2004, pp. 795-808, XP001220676, ISSN: 1063-6692, DOI: 10.1109/TNET. 2004.836123, abstract, figures 1,3, sec. III, IV.

* cited by examiner

ENHANCED MULTICAST TRACEROUTE TO RECEIVE INLINE FAILURE REPLY

TECHNICAL FIELD

The present disclosure relates generally to wide area networks, and more particularly, to enhanced multicast traceroute with reception of an inline failure reply.

BACKGROUND

Multicast techniques allow for sending data to a group of interested receivers. Multicast techniques may make efficient use of network infrastructure, for example, by requiring the source to send a packet only once, even if the packet needs to be delivered to a large number of receivers. Nodes in the network, such as switches and routers, may replicate the packet so that the packet reaches each interested receiver.

DESCRIPTION OF EXAMPLE EMBODIMENTS

Overview

In particular embodiments, a router in a multicast network may comprise one or more processors and one or more computer-readable non-transitory storage media coupled to one or more of the processors. The one or more computer-readable non-transitory storage media may comprise instructions operable when executed by one or more of the processors to cause the router to receive a multicast trace query comprising a data packet. The processors may be operable when executing the instructions to edit the multicast trace query to include data corresponding to the data packet. The processors may be operable when executing the instructions to transmit the edited multicast trace query to a subsequent router. The processors may be operable when executing the instructions to transmit a first message indicating the edited multicast trace query was transmitted to the subsequent router. The processors may be operable when executing the instructions to start a timer for a determined period of time.

In particular embodiments, a method, by a router, of enhanced multicast traceroute may comprise receiving a multicast trace query comprising a data packet The method may further comprise editing the multicast trace query to include data corresponding to the data packet. The method may comprise transmitting the edited multicast trace query to a subsequent router. The method may further comprise transmitting a first message indicating the edited multicast trace query was transmitted to the subsequent router. The method may further comprise starting a timer for a determined period of time.

In particular embodiments, one or more computer-readable non-transitory storage media may embody software that is operable on a router when executed to: receive a multicast trace query comprising a data packet. The software may be operable when executed to edit the multicast trace query to include data corresponding to the data packet. The software may be operable when executed to transmit the edited multicast trace query to a subsequent router. The software may be operable when executed to transmit a first message indicating the edited multicast trace query was transmitted to the subsequent router. The software may be operable when executed to start a timer for a determined period of time.

EXAMPLE EMBODIMENTS

Figure 1:
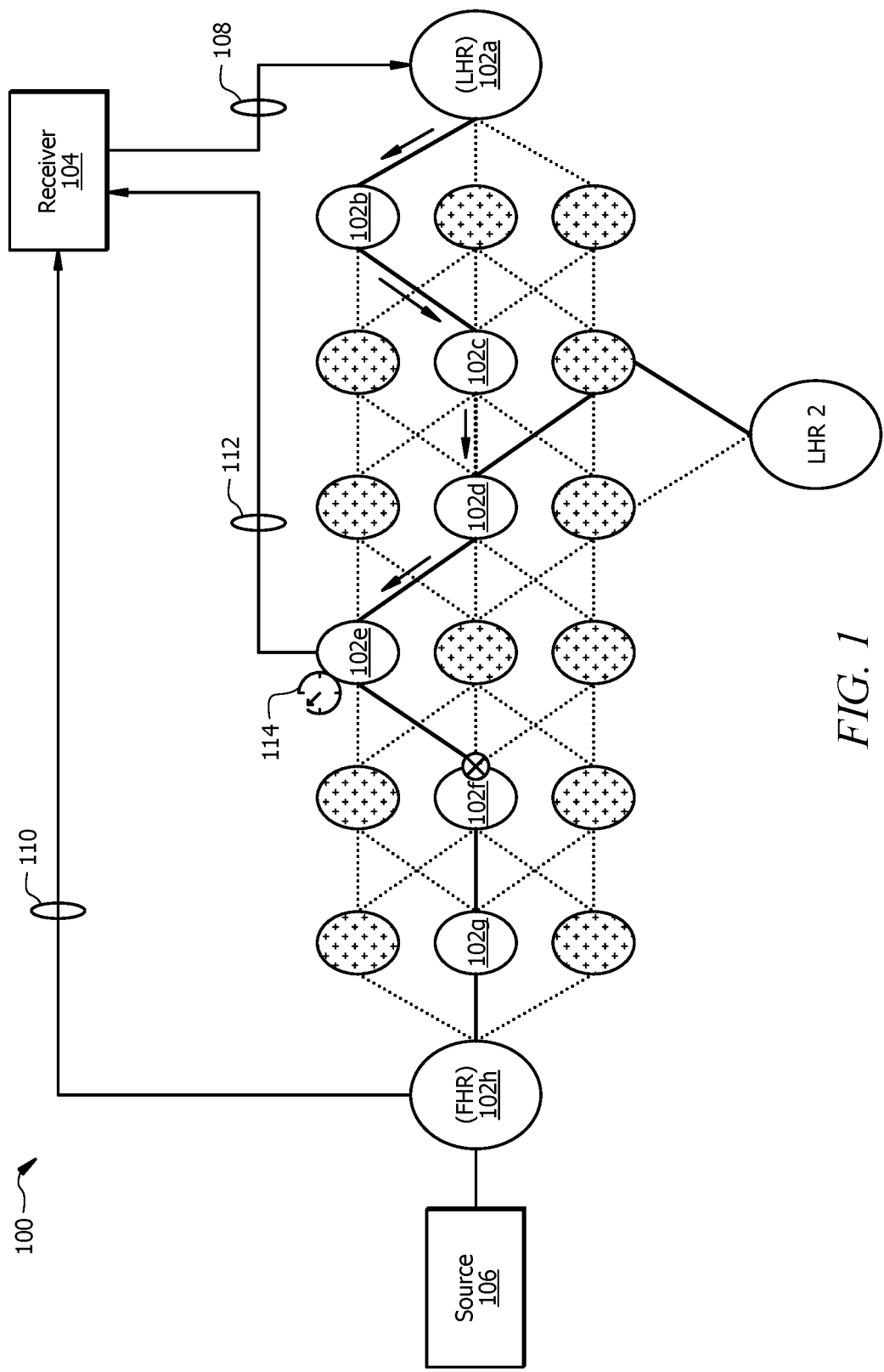
FIG. 1 illustrates an example network for enhanced multicast traceroute.

FIG. 1 illustrates an example of a network 100 that provides Internet Protocol (IP) multicast with an enhanced multicast traceroute. In particular embodiments, the network 100 may be a software-defined wide-area network (SD-WAN). Network 100 may include multiple routers 102 (e.g., 102a-102h), one or more receivers 104, and one or more sources 106. The physical topology for network 100 may be a cloud (representing the WAN) with all routers 102 connecting to the cloud. For purposes of example and explanation, FIG. 1 shows certain connections between certain components (such as connections between certain routers 102). However, FIG. 1 does not imply a particular physical topology as the connections may be made via the cloud.

In general, network 100 may be an underlay network that supports a virtual overlay network. An underlay network may include, for example, all or a portion of: the Internet, one or more IP networks (such as one or more IP Security, IPsec, networks), one or more Multiprotocol Label Switching (MPLS) networks, one or more cellular network(s), and/or other suitable networks. In certain embodiments, the virtual overlay network may include data plane connections/tunnels that carry traffic between components of the network 100. As an example, the virtual overlay network may include IP Security (IPsec) tunnels that carry traffic between components of the network 100. In certain embodiments, the virtual overlay network may carry traffic between a plurality of sites over the underlay network. Each site may connect to the network via one or more WAN-edge routers.

In certain embodiments, the source 106 may include any suitable endpoint that originates a multicast stream. Examples of source 106 may include user devices, such as a desktop computer system, a laptop or notebook computer system, a mobile telephone, a personal digital assistant (PDA), a tablet computer system, an augmented/virtual reality device, etc. Additional examples of source 106 may include servers, mainframes, data centers, cloud platforms, or any other computer system capable of transmitting a multicast stream. As another example, source 106 may be a video camera that provides video data to be multicast to receiver 104 via routers 102a-102h. Router 102h may be configured as an FHR that receives the multicast stream from source 106 and communicates the multicast stream into network 100. In embodiments, router 102h of network 100 may communicate the multicast stream from source 106 to a rendezvous point (RP). The RP of typical networks acts as a meeting place for sources and receivers of the multicast stream. For example, router 102h may register source 106 with a RP such that source 106 sends its multicast stream to the RP to be forwarded to receiver 104. Router 102a may be configured as a last hop router (LHR) that serves receiver 104. Examples of receiver 104 may include user devices, such as a desktop computer system, a laptop or notebook computer system, an interactive kiosk, a mobile telephone, a personal digital assistant (PDA), a tablet computer system, an augmented/virtual reality device, etc. Additional examples of receiver 104 may include servers, mainframes, data centers, cloud platforms, or any other computer system capable of receiving a multicast stream.

In particular embodiments, the source 106 may direct a multicast stream to a group address, but the group address may not directly indicate where to forward data packets of the multicast stream. As such, a multicast tree may be generated to determine a path between the source 106 and one or more receivers 104. Multicast trees may be initiated by a receiver 104 signaling a request to join a group receptive of data from the source 106. In embodiments, a path may be generated from the receiver 104 to the source 106 hob-by-hop via routers 102a-102h using the source address. Once the path of a multicast tree is generated from the receiver 104 to the source 106, the source traffic from source 106 may flow to the receiver 104. In embodiments, traffic may flow through a source tree or a shared tree. For example, in a shared tree, multicast traffic may be rooted anywhere, such as through a*root, for example, in the case of a (*, G) stream. In a source tree, multicast traffic may be rooted through an S root, for example, in the case of an (S, G) stream. In both cases, the G represents multiple receivers that may receive the multicast stream. The S indicates that the multicast stream is to be received from a particular source (i.e., source 106), such as an IP address of a particular video camera. The * is a wildcard indicating that the multicast stream may be received from any source.

Typically, receiver 104 may initiate a multicast trace by sending a query packet 108 to the LHR router 102a, which turns the query packet 108 into a request message. The request message may be forwarded to each upstream router 102 that processes and validates the request message. Once the FHR router 102h and/or source 106 receives the request message, a reply 110 is sent to the receiver 104. In embodiments, the receiver 104 may not receive reply 110 due to network congestion, a broken or non-responsive router 102, or any other suitable problem. In this example, the receiver 104 may resend the query packet 108 with a lower hop count and repeat this process until receiver 104 receives the reply 110.

The aforementioned process may be a time-intensive trial and error procedure. The present disclosure may provide systems and methods operable to detect information about which node (i.e., router 102) is failing within the network 100 through an inline failure reply 112. The network 100 may employ a next hop validation mechanism to make sure the mtrace query packet 108 is forwarded to the next node.

As illustrated, the receiver 104 (i.e., a multicast client) may transmit a multicast trace query as the query packet 108 comprising one or more data packets to the LHR router 102a. The LHR router 102a, and each subsequent router 102, may edit the multicast trace query to include data corresponding to at least one of the data packets. In embodiments, each router 102, or "node", may be required to edit the query packet 108 prior to transmission to a subsequent, upstream router 102. Each router 102 may start a timer 114 as the edited query packet 108 is transmitted upstream to the next router 102. For example, as LHR router 102a transmits edited query packet 108 to router 102b, the timer 114 for LHR router 102a may be initiated. The timer 114 may run for a determined period of time. Once router 102b receives query packet 108, edits the received query packet 108, and transmits the edited query packet 108 to router 102c, the router 102b may then transmit a first message back to LHR router 102a indicating that the edited query packet 108 was transmitted to the subsequent router (router 102c). The LHR router 102a may receive the first message as an acknowledgement that the query packet 108 has been transmitted from router 102b to router 102c and may stop the timer 114 in response to receiving the first message. This process may continue to repeat for each subsequent router 102 until the reply 110 is sent to receiver 104 or until the time period for timer 114 has been exceeded for any subsequent node. For example, as illustrated, there may be a failure between router 102e and router 102f. Router 102e may have transmitted the query packet 108 and started timer 114, but router 102f may not be able to process query packet 108. In this example, the determined time period for router 102e to receive the first message from router 102f may be exceeded. In response to the timer 114 exceeding the determined period of time, router 102e may transmit a second message to the receiver 104, and the second message indicates that the subsequent router (i.e., router 102f) is not operational for multicast. In embodiments, second message may be the inline failure reply 112. With the information provided by the inline failure reply 112, receiver 104 may re-transmit query packet 108 to follow a different path of routers 102.

Although this disclosure describes network 100 in a particular manner, this disclosure contemplates any network as network 100 in any suitable manner. For example, for simplicity, FIG. 1 shows certain communication paths between routers 102a-102h. However, additional communication paths may exist between various routers 102a-102h. Furthermore, in certain embodiments, the network may include other routers 102a-102h (which may be configured as FHRs, RPs, or LHRs, for example), and one or more of routers 102a-102h may communicate with one or more of the other routers. Moreover, network 100 may include any other suitable components, such as a controller in a control plane that may provision, maintain, and/or secure the overlay network and/or a manager in a management/orchestration plane.

Figure 2:
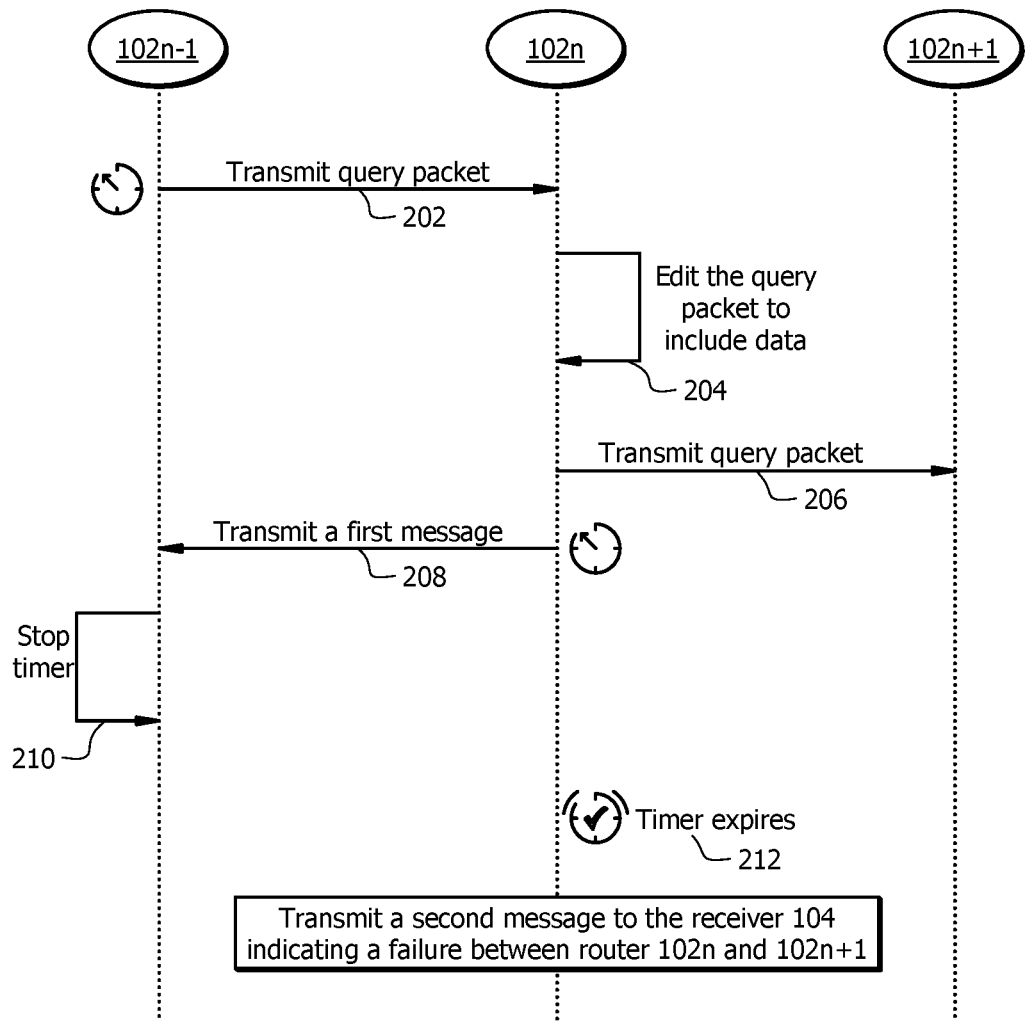
FIG. 2 illustrates an example message flow for enhanced multicast traceroute.

FIG. 2 illustrates an example traffic relay between a first router 102n−1, a second router 102n, and a third router 102n+1. In particular embodiments, second router 102n may be upstream of first router 102n−1 and downstream of third router 102n+1. At step 202, the first router 102n−1 may transmit the query packet 108 to the second router 102n and may start a timer 114 (referring to FIG. 1) associated with first router 102n−1. At step 204, upon receiving the query packet 108 from first router 102n−1, the second router 102n may edit the query packet 108 to include data corresponding to the data packet. Step 206 and step 208 may occur concurrently. At step 206, the second router 102n may transmit the edited query packet 108 to third router 102n+1. At step 208, the second router 102n may transmit a first message to first router 102n−1 and may start a timer 114 associated with second router 102n, and the first message may indicate that the query packet 108 has been transmitted to a subsequent router. Upon receiving the first message, the first router 102n−1 may stop the timer 114 at step 210. After a period of time, the timer 114 may expire or surpass the allocated amount of time designated by the timer 114 for the second router 102n to receive a first message from the third router 102n+1 at step 212. At step 214, the second router 102n may transmit a second message to the receiver 104 indicating a failure of the multicast trace query between second router 102n and third router 102n+1, wherein the second message is the inline failure reply 112 (referring to FIG. 1).

Figure 3:
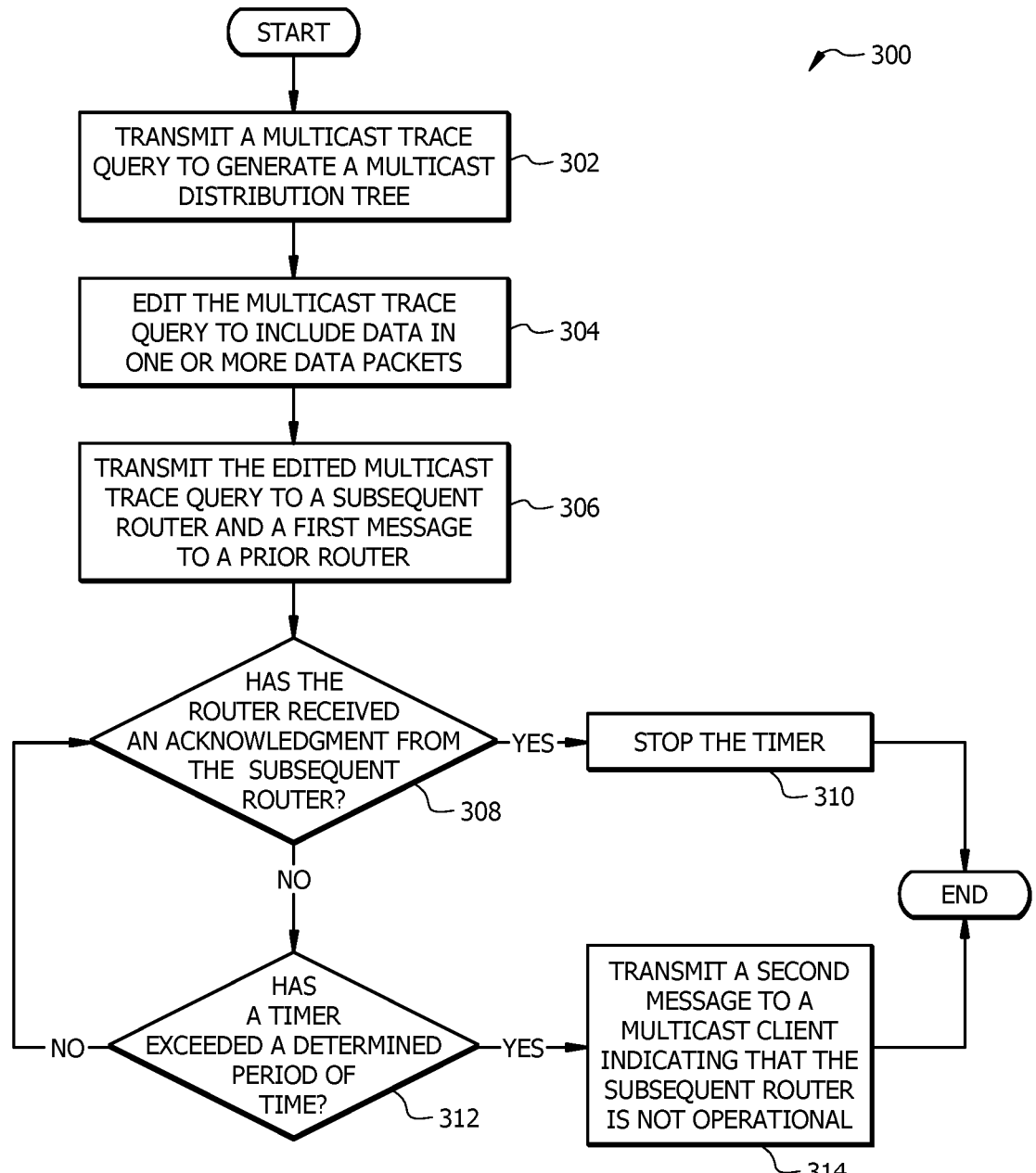
FIG. 3 illustrates an example method for enhanced multicast traceroute.

FIG. 3 illustrates an example method 300 of enhanced multicast traceroute for generating a multicast distribution tree. In embodiments, generating a multicast distribution tree may include validating information for each hop in a multicast network, and the multicast distribution tree is generated as each hop is validated. The method 300 may begin at step 302, where the receiver 104 (referring to FIG.

1) may transmit a multicast trace query, such as query packet 108 (referring to FIG. 1), to generate a multicast distribution tree to the source 106 (referring to FIG. 1). In embodiments, one or more routers 102 (referring to FIG. 1) may receive and forward the query packet 108 to the source 106. At step 304, one of the routers 102 may receive the query packet 108 and may edit the query packet 108 to include data corresponding to the data packet. At step 306, that router 102 may transmit the edited query packet 108 to a subsequent one of the routers 102 further upstream. The router 102 may concurrently transmit a first message to the prior router 102 that transmitted the query packet 108 to the current router 102 and may start the timer 114 (referring to FIG. 1) associated with that router 102. In embodiments, the timer 114 may run for any suitable amount of time. At step 308, the router 102 may determine whether the router 102 has received an acknowledgment message (for example, first message) from the subsequent router 102 having received the query packet 108. If the router 102 has received an acknowledgement message, the method 300 proceeds to step 310. Otherwise, the method proceeds to step 312.

At step 310, in response to receiving the first message from the subsequent router 102 as the acknowledgment message, the router 102 may stop the timer 114. After stopping the timer 114, the method 300 may proceed to end. At step 312, the router 102 may determine whether the timer 114 has exceeded the pre-determined period of time for receiving the first message from subsequent router 102. If the timer 114 has exceeded the period of time, the method 300 proceeds to step 314. Otherwise, the method proceeds back to step 308. At step 314, the router 102 may transmit the inline failure reply 112 (referring to FIG. 1) as a second message to the receiver 104. In embodiments, the inline failure reply 112 may indicate that the subsequent router 102 is not operational for multicast. In certain embodiments, the subsequent router 102 may remain operational for unicast. The receiver 104 may then re-broadcast the multicast trace query in view of the information from the inline failure reply 112 to generate a multicast distribution tree. The method 300 may then end.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method of enhanced multicast traceroute for generating a multicast distribution tree including the particular steps of the method of FIG. 3, this disclosure contemplates any suitable method for generating a multicast distribution tree including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
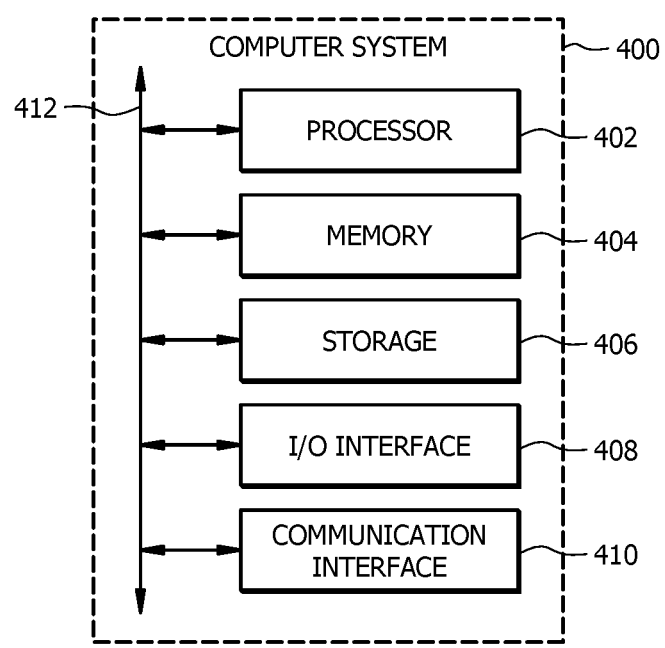
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate. Further, each one of routers 102, receiver 104, and source 106 in FIG. 1 may be any suitable computer system, such as the illustrated computer system 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A router in a multicast network, wherein the router is an intermediate router disposed between a first hop router and a last hop router in the multicast network, the router comprising:
   one or more processors; and
   one or more computer-readable non-transitory storage media comprising instructions that, when executed by the one or more processors, cause one or more components of the router to perform operations comprising:
     receiving a multicast trace query comprising a data packet;
     editing the multicast trace query to include data corresponding to the data packet;
     transmitting the edited multicast trace query to a subsequent router;
     transmitting a first message to a receiver or a prior router indicating the edited multicast trace query was transmitted to the subsequent router; and
     starting a timer for a determined period of time.

2. The router of claim 1, the operations further comprising:
   receiving an acknowledgement from the subsequent router; and
   stopping the timer in response to receiving the acknowledgement.

3. The router of claim 1, the operations further comprising transmitting a second message to a receiver in response to the timer exceeding the determined period of time, the second message indicating that the subsequent router is not operational for multicast.

4. The router of claim 1, wherein the router is a rendezvous point (RP) further configured to:
   transmit the first message to a first prior router.

5. The router of claim 4, wherein the router is further configured to:
   transmit a second message to a receiver, wherein the second message is the same as the first message.

6. The router of claim 1, the operations further comprising generating a multicast distribution tree that includes validation information for each hop in the multicast network, wherein the multicast distribution tree is generated as each hop is validated.

7. A method by a router of enhanced multicast traceroute, wherein the router is an intermediate router disposed between a first hop router and a last hop router in a multicast network comprising:
   receiving a multicast trace query comprising a data packet;
   editing the multicast trace query to include data corresponding to the data packet;
   transmitting the edited multicast trace query to a subsequent router;
   transmitting a first message to a receiver or a prior router indicating the edited multicast trace query was transmitted to the subsequent router; and
   starting a timer for a determined period of time.

8. The method of claim 7, further comprising:
   receiving an acknowledgement from the subsequent router; and
   stopping the timer in response to receiving the acknowledgement.

9. The method of claim 7, further comprising transmitting a second message to a receiver in response to the timer exceeding the determined period of time, the second message indicating that the subsequent router is not operational for multicast.

10. The method of claim 7, further comprising transmitting the first message to a first prior router, wherein the router is a rendezvous point (RP).

11. The method of claim 10, further comprising transmitting a second message to a receiver, wherein the second message is the same as the first message.

12. The method of claim 7, further comprising generating a multicast distribution tree that includes validation information for each hop in a multicast network, wherein the multicast distribution tree is generated as each hop is validated.

13. A non-transitory computer-readable medium comprising instructions that are configured, when executed by a processor of an intermediate router disposed between a first hop router and a last hop router in a multicast network, to:
  receive a multicast trace query comprising a data packet;
  edit the multicast trace query to include data corresponding to the data packet;
  transmit the edited multicast trace query to a subsequent router;
  transmit a first message to a receiver or a prior router indicating the edited multicast trace query was transmitted to the subsequent router; and
  start a timer for a determined period of time.

14. The non-transitory computer-readable medium of claim 13, wherein the instructions are further configured to:
  receive an acknowledgement from the subsequent router; and
  stop the timer in response to receiving the acknowledgement.

15. The non-transitory computer-readable medium of claim 13, wherein the instructions are further configured to:
  transmit a second message to a receiver in response to the timer exceeding the determined period of time, the second message indicating that the subsequent router is not operational for multicast.

16. The non-transitory computer-readable medium of claim 13, wherein the instructions are further configured to:
  transmit the first message to a first prior router; and
  transmit a second message to a receiver, wherein the second message is the same as the first message.

17. The non-transitory computer-readable medium of claim 13, wherein the instructions are further configured to:
  generate a multicast distribution tree that includes validation information for each hop in a multicast network, wherein the multicast distribution tree is generated as each hop is validated.

* * * * *